L. J. BOGNAR.
CONVEYER FOR CORES.
APPLICATION FILED APR. 24, 1915.
1,195,332.
Patented Aug. 22, 1916.
2 SHEETS—SHEET 2.
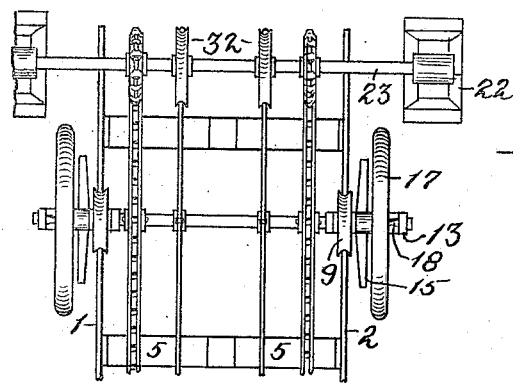
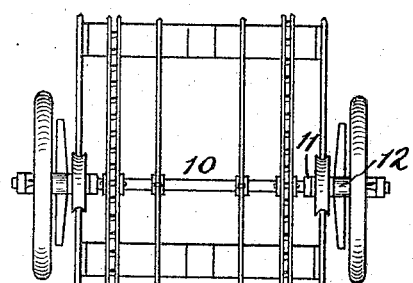
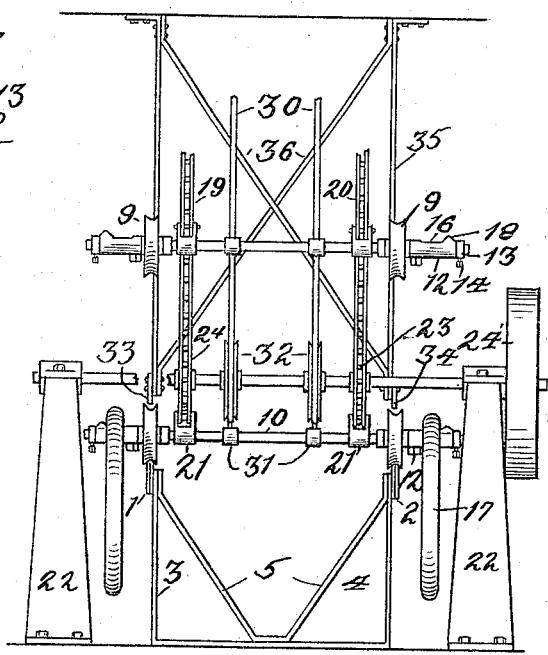
Fig. 3
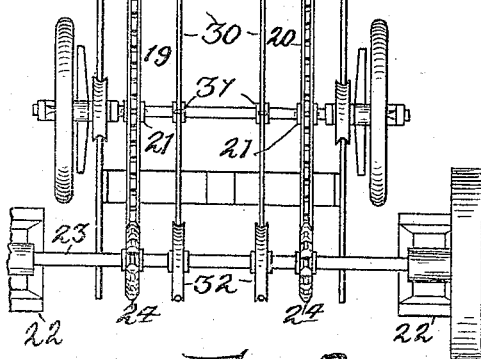
Fig. 2
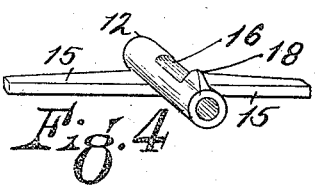
Fig. 4
Inventor
Louis J. Bognar,
By C. E. Humphrey
Attorney

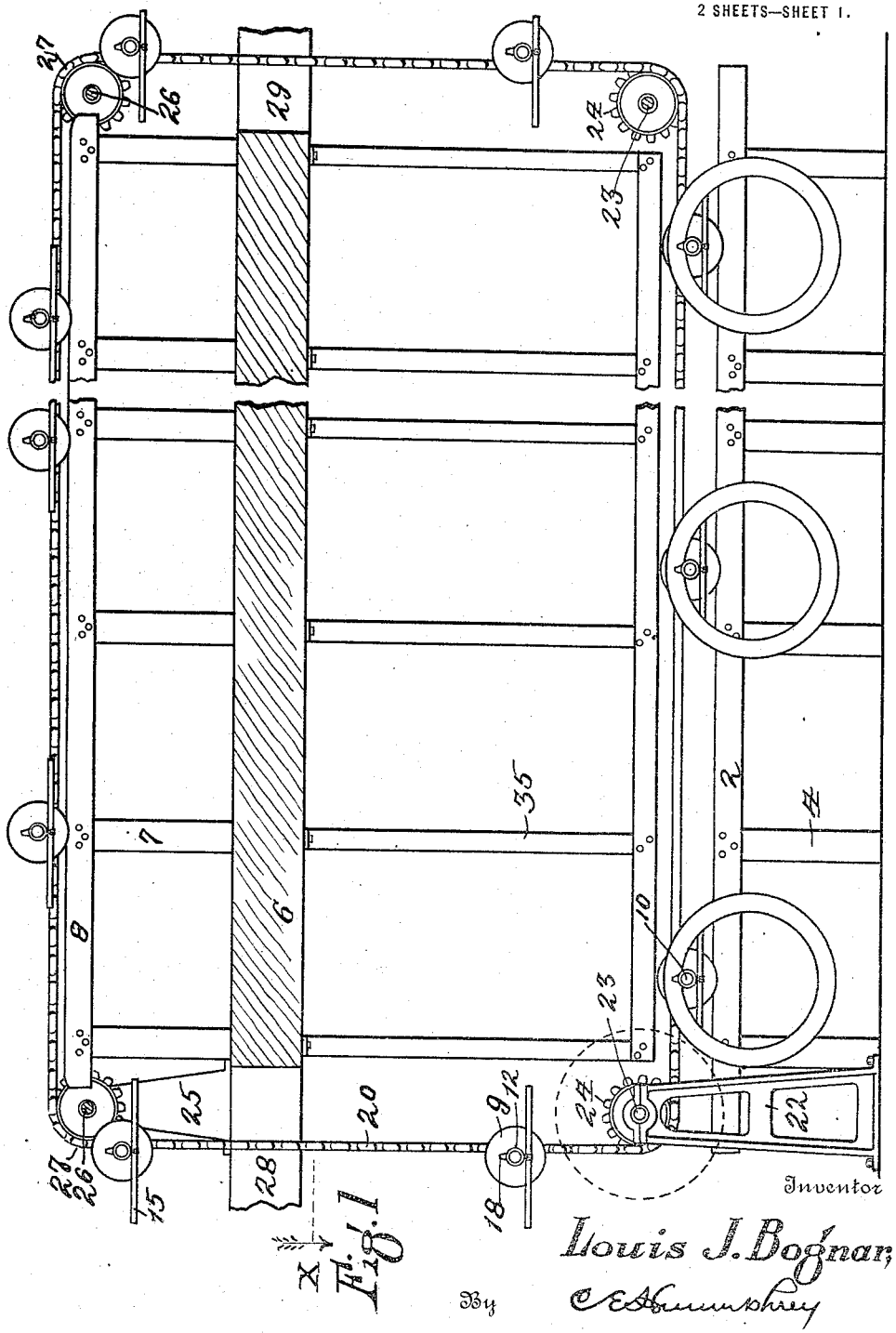

UNITED STATES PATENT OFFICE.

LOUIS J. BOGNAR, OF AKRON, OHIO.

CONVEYER FOR CORES.

1,195,332.  Specification of Letters Patent.  Patented Aug. 22, 1916.

Application filed April 24, 1915.  Serial No. 23,650.

*To all whom it may concern:*

Be it known that I, LOUIS J. BOGNAR, a subject of Francis Joseph, Emperor of Austria-Hungary, residing at Akron, in the county of Summit and State of Ohio, have invented new and useful Improvements in Conveyers for Cores, of which the following is a specification.

This invention relates to conveyers especially designed for transporting cores used in the manufacture of pneumatic tire shoes from place to place in a factory. Briefly, the cores used in the manufacture of pneumatic tire shoes are exceedingly heavy and in the manufacture of tire shoes it is required that these cores be transported from one part or department of a factory to another part, so that the various operations connected with the tire or tire shoes such, for instance, as the building up of the shoe, the vulcanizing, the stripping of the cured shoe from the core, the cleaning of the core for reuse, etc., it is desirable that this transportation be accomplished with a minimum amount of labor and time, so that the tire shoes may be manufactured quickly, cheaply and economically. In order to transport these cores from place to place, as for instance, from the shoe-building room to the vulcanizing room, and from the vulcanizing room to the stripping and cleaning rooms, an efficient conveyer capable of transporting the heavy cores becomes a valuable implement in saving time, cost and labor in the production of the shoes, and hence, the primary object of this invention is to provide a conveyer capable of transporting cores from place to place.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a conveyer embodying this invention, shown in connection with a portion of a building in which the conveyer is mounted; Fig. 2, is a section of a conveyer embodying this invention taken on line X of Fig. 1; Fig. 3, is an end view of the same; and, Fig. 4, is a detail of one of the core-holding devices.

Referring to the drawings in detail, the reference numerals 1 and 2 denote two parallel spaced rails constituting a track on which the mechanism of the conveyer is supported. The rails 1 and 2 are supported by upright members 3 and 4 respectively and these are reinforced by means of braces 5. The upright members may be supported, for instance, on the floor of one room which is provided with an upper wall or ceiling 6 which forms the floor of an upper room. Supported on the floor 6 are a plurality of uprights 7 preferably positioned in vertical alinement with the uprights 3 and 4, and supported by the uprights 7 are a pair of parallel rails 8 arranged in vertical alinement with the rails 3 and 4.

Adapted to run on the track which consists of the rails 1 and 2 in the lower room and on the rails 8 in the upper room are a plurality of carriers, and as they are all similar a description of one is believed to be sufficient. Each carrier comprises a pair of grooved wheels 9 each adapted to run on one of the rails 1, 2 or 8 and each pair is mounted on a transversely-extending irrevoluble axle 10. These wheels are held in longitudinal movement in one direction on the axle 10 by means of a collar 11 and from movement in the opposite direction by sleeves 12, which are secured to both ends of the axle 10 and held in position by some means such, for instance, as collars 13 held in place by set screws 14. These sleeves are rotatable on the axles and are provided on their under face with cross bars 15 and may be provided on their upper faces with seats 16 on which the cores 17 are hung. In order to prevent the cores from slipping over the ends of the sleeves the latter are provided with lugs 18 constituting abutments. The function of the cross bars 15 is to hold a core not only from inward longitudinal sliding movement while suspended to the sleeve 12 but also to prevent the core from swinging and hold it approximately in a plane at right angles to the shaft 10.

In practice, the wheels 9 are adapted to run on the track in the lower room which consists of the rails 1 and 2 and customarily there will be a plurality of these carriages, such as have just been described, and they will be arranged in spaced relation a distance sufficiently far apart to prevent the cores carried by them from encountering one another, but otherwise, the distance between the carriages is immaterial. In order to move the carriages along the track I provide longitudinally-extending sprocket chains 19 and 20 preferably spaced apart laterally and each of these sprocket chains is attached to the various axles 10 by means of coupling members 21. At the ends of the track are provided pairs of housings 22, one pair only being shown in Fig. 1, and which constitute a supporting means for a transversely-extending shaft 23 on which are sprocket wheels 24 with which the sprocket chains 19 and 20 engage. Mounted on the shaft 23 is a belt-pulley 24' for communicating motion to the shaft 23, but of course, any other source of power, such for instance, as a motor may be employed, if desired. Mounted in the upper room are two pair of housings 25 each pair constituting a supporting means for a shaft 26, each shaft provided with a pair of sprocket wheels 27 which engage the sprocket chains 19 and 20 so that after passing around the sprocket wheels 24 at the left of the machine in Fig. 1, the chains pass upwardly through a suitable opening 28 in the floor 6 and over the sprocket wheels 27 at the left of the figure to the sprocket wheels 27 at the right and from thence downwardly through an opening 29 in the floor to the sprocket wheels 24 at the right, thereby making a complete loop. These sprocket chains are adapted to hold the carriages in spaced relation and to move them along the track in the lower room and carry them outwardly through the opening 28 and from thence over the track composed of the rails 8 in the upper room and from thence down through the opening 29 onto the track in the lower room. Of course, the general arrangement of the tracks may be varied at will, and they may be of any length and instead of passing through the openings 28 and 29 immediately to the upper room they may extend upwardly past several floors to any convenient place or room.

In order to supplement the sprocket chains 19 and 20 and assist them in their function of moving the carriages along the various tracks, and further, to provide against any accident such as the breakage of either of the chains, I employ a pair of flexible members such, for instance, as wire ropes 30 which are arranged in spaced relation laterally and in parallelism with the sprocket chains 19 and 20 and each is connected by coupling members 31 to each of the axles 10. These wire ropes as well as the chains 19 and 20 are positioned over the axles while the axles on the track in the lower room and are under the axles when the carriages are on the track in the upper room. Mounted on both shafts 23 are a pair of sheaves 32 to receive and guide the wire ropes and similar sheaves (not shown) are provided on the upper shafts 26.

It will be noted that sleeves 12 are secured on each end of each axle 10 so that both sides of the device may be used for the transportation of cores either simultaneously or alternately, but it may happen in practice that a core is placed on one end only of an axle and as these cores are very heavy there will be a tendency to tip up or tilt the axle, due to the heavy weight placed at one end only thereof. In order to prevent this tilting of the axles I provide a frame consisting of a pair of longitudinally-extending bars 33 and 34 which are positioned immediately over the rails 1 and 2 respectively, but spaced therefrom, so that the under faces of the bars 33 and 34 are slightly separated from the upper portions of the peripheries of the wheels 9. These bars 33 and 34 are supported by uprights 35 connected to some suitable anchorage such as the ceiling 6 and to stiffen these bars cross bars 36 are employed. By this arrangement the wheels 9 are permitted to freely run over the rails 1 and 2 but in case of any of the axles 10 being tilted by reason of the hanging of a core on one end only of an axle, its opposite end can only move imperceptibly, being prevented by either of the bars 38 or 39, as the case may be.

I claim:—

1. A conveyer of the type described comprising a pair of rails constituting a track, a second pair of rails constituting a second track positioned above and in vertical alinement with the rails of the first track, sprocket wheels at both ends of both tracks, a carriage adapted to run on said tracks, said carriage comprising a pair of grooved wheels running on said rails and an axle, a core-holding member positioned on the end of said axle, means carried by said member for holding a core mounted on said member in a plane at right angles to said axle, a sprocket chain running on said sprocket wheels and having connection with said carriage for shifting the position of the latter, and means for moving said sprocket chain and carriage.

2. A conveyer of the class described comprising a pair of rails constituting a track, a carriage adapted to run on said track, said carriage comprising a pair of wheels arranged to run on said rails, an axle for said wheels, a sprocket-chain moving longitudinally of said track for shifting the position of said carriage, a sleeve constituting a tire-making-core-carrying member mounted on the end of said axle and a cross bar on said sleeve positioned near the inner end thereof and adapted to engage the sides of said core for holding it in a plane at right angles to said axle.

3. A conveyer of the class described comprising a pair of rails constituting a track, a carriage adapted to run on said track, said carriage comprising a pair of wheels arranged to run on said rails, an axle for said wheels, a sprocket chain moving longitudinally of said track for shifting the position of said carriage, a sleeve provided with an outwardly-projecting core-engaging bar mounted on the end of said axle, the portion of the sleeve unoccupied by said bar constituting a seat for a tire-making-core.

In testimony whereof I have hereunto set my hand.

LOUIS J. BOGNAR.

Copies of this patent may be obtained for five cents each, by addressing the "Commissioner of Patents, Washington, D. C."